US012031002B2

(12) United States Patent
Katou et al.

(10) Patent No.: US 12,031,002 B2
(45) Date of Patent: Jul. 9, 2024

(54) PREPREG, METHOD FOR PRODUCING PREPREG, AND MOLDED ARTICLE

(71) Applicant: DIC Corporation, Tokyo (JP)

(72) Inventors: Naoki Katou, Takaishi (JP); Tomoaki Shinchi, Takaishi (JP)

(73) Assignee: DIC CORPORATION, Tokyo (JP)

( * ) Notice: Subject to any disclaimer, the term of this patent is extended or adjusted under 35 U.S.C. 154(b) by 0 days.

(21) Appl. No.: 18/555,775

(22) PCT Filed: Mar. 17, 2022

(86) PCT No.: PCT/JP2022/012139
§ 371 (c)(1),
(2) Date: Oct. 17, 2023

(87) PCT Pub. No.: WO2022/249672
PCT Pub. Date: Dec. 1, 2022

(65) Prior Publication Data
US 2024/0101776 A1 Mar. 28, 2024

(30) Foreign Application Priority Data

May 24, 2021 (JP) ................................ 2021-086990

(51) Int. Cl.
*C08J 5/24* (2006.01)
*B29B 15/10* (2006.01)
*C08K 5/17* (2006.01)

(52) U.S. Cl.
CPC .............. *C08J 5/249* (2021.05); *B29B 15/10* (2013.01); *C08K 5/17* (2013.01)

(58) Field of Classification Search
CPC . C08J 5/24; C08J 5/249; C08J 2357/04; C08J 2333/12; B29B 15/10; C08K 5/17
USPC ............................. 428/297.4; 524/244, 556
See application file for complete search history.

(56) References Cited

U.S. PATENT DOCUMENTS

| 2006/0025534 A1* | 2/2006 | Johnson ............. C09D 4/06 |
| | | 524/556 |
| 2007/0151652 A1 | 7/2007 | Burks et al. |
| 2010/0255316 A1 | 10/2010 | Reese et al. |
| 2011/0014480 A1 | 1/2011 | Fader |
| 2015/0376445 A1 | 12/2015 | Nakamura et al. |
| 2017/0267806 A1 | 9/2017 | Goeschel et al. |
| 2019/0092915 A1 | 3/2019 | Takikawa et al. |
| 2020/0385539 A1 | 12/2020 | Takikawa et al. |
| 2022/0265420 A1 | 8/2022 | Kelp |

FOREIGN PATENT DOCUMENTS

| CN | 107793548 A | 3/2018 |
| JP | 2006152161 A | 6/2006 |
| JP | 2009-520107 A | 5/2009 |
| JP | 2017-500391 A | 1/2017 |
| KR | 20150121065 A | 10/2015 |
| KR | 20220007652 A | 1/2022 |
| WO | 2014/057740 A1 | 4/2014 |
| WO | 2017/163899 A1 | 9/2017 |
| WO | 2019065210 A1 | 4/2019 |

OTHER PUBLICATIONS

English Translation of International Search Report dated May 17, 2022, issued in counterpart Application No. PCT/JP2022/012139. (2 pages).

Decision to grand patent dated Nov. 15, 2022, issued in counterpart JP Application No. 2022-553639, with English Translation. (6 pages).

* cited by examiner

*Primary Examiner* — Camie S Thompson
(74) *Attorney, Agent, or Firm* — WHDA, LLP

(57) ABSTRACT

Provided is a prepreg including: a resin composition including a urethane (meth)acrylate (A), a polymerization initiator (B), and an amine catalyst (C); and reinforcement fibers (D). The urethane (meth)acrylate (A) is a reaction product of a polyisocyanate compound (a1) and a hydroxyl group-containing compound (a2), the polyisocyanate compound (a1) including polymethylene polyphenyl polyisocyanate and diphenylmethane diisocyanate, the hydroxyl group-containing compound (a2) including a compound having a hydroxyl group and a (meth)acryloyl group. This prepreg has excellent workability and product stability, reduces the occurrence of poor molding, and allows a molded article having excellent workability and handleability to be obtained, and therefore can be used in, for example, automobile components, railway vehicle components, aerospace craft components, ship components, housing equipment components, sporting components, light vehicle components, building and civil engineering components, and casings of OA equipment.

7 Claims, No Drawings

PREPREG, METHOD FOR PRODUCING PREPREG, AND MOLDED ARTICLE

TECHNICAL FIELD

The present invention relates to a prepreg from which a molded article having excellent workability and moldability can be obtained, a method for producing the prepreg, and the molded article.

BACKGROUND ART

Fiber-reinforced resin composite materials reinforced with reinforcement fibers such as carbon fibers and glass fibers have been receiving attention because they are excellent in heat resistance and mechanical strength despite being lightweight. The fiber-reinforced resin composite materials have been increasingly used in various structures, including casings and various components of automobiles and aircraft. Examples of the method for molding such a fiber-reinforced resin composite material include a method in which an intermediate material referred to as a prepreg, in which reinforcement fibers are impregnated with a thermosetting resin, is cured and molded by autoclave molding or press molding.

Resins for prepregs are usually required to have both stability at normal temperature and curability by heating or the like. Thus, in general, thermosetting resins such as epoxy resin compositions have been frequently used. However, prepregs obtained using epoxy resins need to be molded at high temperatures in order to quickly complete curing of the resins. Therefore, a radically polymerizable resin composition capable of achieving high productivity has been under development.

To solve this problem, a radically polymerizable resin composition capable of achieving high productivity and stability at normal temperature has been under development (for example, refer to PTL 1). The radically polymerizable resin composition includes a radical polymerizable resin that includes a tri(meth)acrylate compound with a specific structure, a (meth)acrylic acid adduct of bisphenol A diglycidyl ether, and a di(meth)acrylate compound with a specific structure, as essential components. There are problems in that the radically polymerizable resin composition requires UV curing in order to improve the workability (tack property) of a prepreg and causes insufficient interlayer adhesion of a molded article.

In addition, there is another problem in that, when reinforcement fibers such as carbon fibers are coated or impregnated with the radically polymerizable resin composition (solution), if the viscosity of the resin composition is too low, the reinforcement fibers easily move and the weight (mass) of the resin composition easily changes, which results in a prepreg having an unstable product-weight, meanwhile, if the viscosity is too high, when the epoxy resin composition is transported (delivered) using a pump, the delivery itself is difficult, and besides, the impregnating properties into the reinforcement fibers decrease, which causes the resulting prepreg of lower product quality.

In addition, there are problems in handleability, product stability, and the like that, immediately after the preparation of a resin composition including a catalyst (a curing accelerator) or during the storage of the resin composition at normal temperature, the catalyst causes a curing reaction to proceed to result in an increase in the viscosity of the resin composition, which causes, for example, a shorter pot life and an unstable product-weight of the resin composition.

CITATION LIST

Patent Literature

PTL 1: Japanese Unexamined Patent Application Publication No. 2006-152161

SUMMARY OF INVENTION

Technical Problem

An object of the present invention is to provide a prepreg capable of reducing thickening after the preparation of a resin composition (solution) used in the prepreg, capable of achieving a stable product-weight after a heating step, and thus having excellent workability and product stability, and also provide a method for producing the prepreg, and a molded article obtained using the prepreg.

Solution to Problem

The inventors of the present invention found that a prepreg including a specific urethane (meth)acrylate, a polymerization initiator, an amine catalyst, and reinforcement fibers had excellent workability and product stability, reduced the occurrence of poor molding, and allows a molded article having excellent workability, to be obtained, and thus the inventors completed the present invention.

That is, the present invention relates to a prepreg including: a resin composition including a urethane (meth)acrylate (A), a polymerization initiator (B), and an amine catalyst (C); and reinforcement fibers (D), in which the urethane (meth)acrylate (A) is a reaction product of: a polyisocyanate compound (a1) including polymethylene polyphenyl polyisocyanate and diphenylmethane diisocyanate; and a hydroxyl group-containing compound (a2) including a compound having a hydroxyl group and a (meth)acryloyl group.

In the prepreg according to the present invention, the amine catalyst is preferably an acid-blocked amine catalyst.

In the prepreg according to the present invention, the dissociation temperature of the acid-blocked amine catalyst is preferably 50° C. to 70° C.

In the prepreg according to the present invention, the diphenylmethane diisocyanate is preferably at least one selected from the group consisting of 2,4'-diphenylmethane diisocyanate, 4,4'-diphenylmethane diisocyanate, and carbodiimide-modified 4,4'-diphenylmethane diisocyanate.

In the prepreg according to the present invention, the initial viscosity (at 20° C.) of the resin composition is preferably 300 mPa·s to 50,000 mPa·s.

The present invention relates to a method for producing the prepreg, the method including:
  a step of coating and impregnating the reinforcement fibers (D) with the resin composition controlled to have a temperature of 30° C. or lower; and
  a step of heating the reinforcement fibers (D) coated and impregnated with the resin composition, at a temperature of 40° C. to 80° C.

The method for producing the prepreg according to the present invention preferably further includes a step of aging for 12 to 48 hours in an atmosphere of 10° C. to 50° C.

The present invention relates to a molded article being a cured product of the prepreg.

Advantageous Effects of Invention

According to the present invention, a prepreg capable of reducing thickening after the preparation of a resin composition (solution) and having a stable product-weight after a heating step can be obtained, and thus the prepreg has excellent workability and product stability, reduces the occurrence of poor molding, and allows the achievement of a molded article having excellent workability and handleability, whereby the molded article can be preferably used in, for example, automobile components, railway vehicle components, aerospace craft components, ship components, housing equipment components, sporting components, light vehicle components, building and civil engineering components, and casings of OA equipment, and can be particularly preferably used in, for example, housing equipment components and building and civil engineering components.

DESCRIPTION OF EMBODIMENTS

[Prepreg]

The present invention relates to a prepreg including: a resin composition including a urethane (meth)acrylate (A), a polymerization initiator (B), and an amine catalyst (C); and reinforcing fibers (D), in which the urethane (meth)acrylate (A) is a reaction product of: a polyisocyanate compound (a1) including polymethylene polyphenyl polyisocyanate and diphenylmethane diisocyanate; and a hydroxyl group-containing compound (a2) including a compound having a hydroxyl group and a (meth)acryloyl group.

[Urethane (meth)acrylate (A)]

The urethane (meth)acrylate (A) is a reaction product of: the polyisocyanate compound (a1) including polymethylene polyphenyl polyisocyanate and diphenylmethane diisocyanate; and the hydroxyl group-containing compound (a2) including the compound having the hydroxyl group and the (meth)acryloyl group.

The polyisocyanate compound (a1) (hereinafter, referred to as "the component (a1)") includes the polymethylene polyphenyl polyisocyanate as an essential starting material. The aromatic ring polynuclear structure of the polymethylene polyphenyl polyisocyanate having high affinity to surfaces of the reinforcement fibers (D) allows the achievement of a prepreg having enhanced adhesion to the reinforcement fibers and a molded article obtained using the prepreg.

The polymethylene polyphenyl polyisocyanate is represented by the following general formula (1). Note that the polymethylene polyphenyl polyisocyanates can be used alone or in combination of two or more.

[Chemical Formula 1]

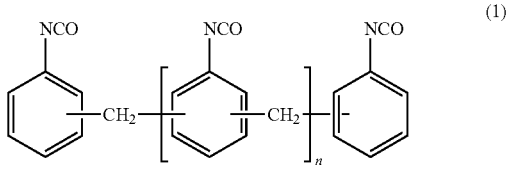

(1)

(where n is an integer not less than 1.)

Examples of a commercially available product that can be used as the polymethylene polyphenyl polyisocyanate include "Millionate MR-100" and "Millionate MR-200", manufactured by Tosoh Corporation, "WANNATE PM-200" and "WANNATE PM-400", manufactured by Wanhua Chemical Group Co., Ltd., "COSMONATE M-1500", manufactured by Mitsui Chemicals, Inc., and "VORANATE M-595", manufactured by The Dow Chemical Company.

From the viewpoint of further enhancing the adhesion properties of the resulting molded article, the ratio of the polymethylene polyphenyl polyisocyanate in the starting materials, excluding the reinforcement fibers (D), of the prepreg is preferably within a range of 1% by mass to 40% by mass.

Besides the polymethylene polyphenyl polyisocyanate, the polyisocyanate compound (a1) includes diphenylmethane diisocyanate (MDI) as an essential starting material.

The diphenylmethane diisocyanate (MDI) is preferably at least one selected from the group consisting of 2,4'-diphenylmethane diisocyanate, 4,4'-diphenylmethane diisocyanate, and carbodiimide-modified 4,4'-diphenylmethane diisocyanate.

Furthermore, besides the polymethylene polyphenyl polyisocyanate and the diphenylmethane diisocyanate (MDI), use can be made of aromatic polyisocyanates, such as nurate-modified diphenylmethane diisocyanate, biuret-modified diphenylmethane diisocyanate, urethane imine-modified diphenylmethane diisocyanate, polyol-modified diphenylmethane diisocyanates modified with a polyol having a number-average molecular weight of 1000 or less, such as diethylene glycol and dipropylene glycol, tolylene diisocyanate (TDI), tolidine diisocyanate, xylylene diisocyanate, 1,5-naphthalene diisocyanate, and tetramethylxylene diisocyanate; alicyclic polyisocyanates, such as isophorone diisocyanate (IPDI), hydrogenated diphenylmethane diisocyanate, hydrogenated xylylene diisocyanate, and norbornene diisocyanate; and aliphatic polyisocyanates, such as hexamethylene diisocyanate, nurate-modified hexamethylene diisocyanate, biuret-modified hexamethylene diisocyanate, hexamethylene diisocyanate adducts, and dimer acid diisocyanate.

[Hydroxyl Group-Containing Compound (a2)]

The hydroxyl group-containing compound (a2) (hereinafter, sometimes referred to as "the component (a2)") includes a compound having a hydroxyl group and a (meth)acryloyl group, as an essential starting material. The urethane (meth)acrylate (A) obtained using the compound having the hydroxyl group and the (meth)acryloyl group leads to a molded article having excellent toughness or the like, and is therefore useful.

Examples of the compound having the hydroxyl group and the (meth)acryloyl group include hydroxyalkyl (meth)acrylates. Note that these compounds having the hydroxyl groups and the (meth)acryloyl groups can be used alone or in combination of two or more.

Examples of the hydroxyalkyl (meth)acrylate include 2-hydroxyethyl (meth)acrylate, 3-hydroxypropyl (meth)acrylate, 4-hydroxy-n-butyl (meth) acrylate, 2-hydroxypropyl (meth)acrylate, 2-hydroxy-n-butyl (meth)acrylate, and 3-hydroxy-n-butyl (meth) acrylate, and preferred is 2-hydroxyethyl (meth)acrylate. Note that these hydroxyalkyl (meth)acrylates can be used alone or in combination of two or more.

Furthermore, in the hydroxyl group-containing compound (a2), polyols other than the compound having the hydroxyl group and the (meth)acryloyl group are preferably used together with the compound from the viewpoint of further enhancing the toughness or the like of the resulting molded article.

The other polyols are not limited to particular ones, and examples thereof that can be used include alkylene oxide adducts of bisphenol A, alkylene oxide adducts of aromatic diols, polyester polyols, acrylic polyols, polyether polyols, polycarbonate polyols, and polyalkylene polyols. These polyols can be used alone or in combination of two or more.

The molar ratio (NCO/OH) of an isocyanate group (NCO) of the polyisocyanate compound (a1) to a hydroxyl group (OH) of the hydroxyl group-containing compound (a2), each compound being a starting material of the urethane (meth) acrylate (A), is preferably 0.7 to 1.2, and more preferably 0.9 to 1.0.

[Polymerization Initiator (B)]

The polymerization initiator (B) is not limited to a particular one, and examples thereof include an organic peroxide, an azo compound, and a redox initiator. In particular, an organic peroxide is preferred from the viewpoint of stability at normal temperature (23° C.). Note that the polymerization inhibitor (B) can be used alone or in combination of two or more kinds.

Examples of the organic peroxide include diacyl peroxide compounds, peroxy ester compounds, hydroperoxide compounds, ketone peroxide compounds, alkyl perester compounds, percarbonate compounds, and peroxyketals, and these organic peroxides can be suitably selected in accordance with molding conditions. Note that these organic peroxides can be used alone or in combination of two or more.

Among the above-mentioned organic peroxides, an organic peroxide of which the temperature for achieving a 10-hour half-life to reduce molding time is preferably 60° C. to 100° C. and more preferably 65° C. to 95° C. is used. The temperature is preferably within a range of 60° C. to 100° C. because a prepreg can have a long service life at normal temperature and can be cured in a shorter time (5 minutes or shorter) by heating, and the use of the prepreg according to the present invention leads to more excellent curability and moldability. Examples of such polymerization initiator include 1,6-bis(t-butylperoxycarbonyloxy)hexane, 1,1-bis(t-butylperoxy)cyclohexane, 1,1-bis(t-amylperoxy)cyclohexane, 1,1-bis(t-hexylperoxy)cyclohexane, t-butylperoxy diethyl acetate, t-butylperoxy isopropyl carbonate, t-amylperoxy isopropyl carbonate, t-hexylperoxy isopropyl carbonate, di-tert-butylperoxy hexahydroterephthalate, t-amylperoxy trimethylhexanoate, and t-hexylperoxy-2-ethylhexanoate.

The content of the polymerization initiator (B) in the resin composition (solids) used in the prepreg according to the present invention is preferably 0.3% by mass to 3% by mass and more preferably 0.5% by mass to 2.5% by mass from the viewpoint of achieving both excellent curability and storage stability.

[Amine catalyst (C)]

The prepreg according to the present invention is characterized in that the resin composition includes an amine catalyst, and the amine catalyst is preferably an acid-blocked amine catalyst. Compared with a metal catalyst (such as a tin catalyst) which has been conventionally used, the amine catalyst is preferably used because the use of the amine catalyst reduces an increase in reaction rate at low temperatures.

Examples of the amine catalyst include triethylenediamine and 1,8-diazabicyclo[5.4.0]undecene-7 (DBU). In particular, acid-blocked amine catalysts that are phenolates or phthalates such as DBU are preferred. Among the acid-blocked amine catalysts, an acid derivative of 1,8-diazabicyclo[5.4.0]undecene-7 (DBU) is more preferred. Among them, the acid derivative of DBU is particularly preferably used because the use of the acid derivative of DBU allows a reaction to rapidly proceed at the heating step after coating and impregnation of the reinforcement fibers (D) with the resin composition, the viscosity of the thickened resin composition increases, the movement of the reinforcement fibers (D) is reduced, and the movement of the resin composition itself is reduced, whereby a prepreg having a stable product-weight can be obtained, resulting in excellent product stability, which is particularly preferred.

The dissociation temperature of the acid-blocked amine catalyst is preferably 50° C. to 80° C., and more preferably 60° C. to 70° C. Note that the dissociation temperature means a temperature at which the dissociation of an acid block from an amine causes the activity of the catalyst to be exerted. When the dissociation temperature is within the above-mentioned range, in the case where, for example, an organic peroxide is used as the polymerization initiator (B), the decomposition of the organic peroxide can be prevented, and furthermore, a reaction at low temperatures can be reduced, and, with an increase in the viscosity of the thickened resin composition, the movement of the reinforcement fibers (D) is reduced and the movement of the resin composition itself is also reduced, so that a prepreg having a stable product-weight can be obtained, which results in excellent product stability.

Note that, in the case of impregnating a conventional resin composition with reinforcement fibers, for example, a curing reaction was caused to proceed by the step of 48-hour aging after the impregnation, but, there were problems in that initial thickening was insufficient, hence the movement of the reinforcement fibers and the movement of the resin composition itself were not able to be reduced, which resulted in an unstable product-weight and a decrease in the quality of a prepreg. However, the prepreg according to the present invention does not have such problems and is therefore useful.

The resin composition used in the present invention includes the urethane (meth)acrylate (A), the polymerization initiator (B), and the amine catalyst (C), in which the initial viscosity (at 20° C.) of the resin composition is preferably 300 mPa·s to 50,000 mPa·s, and more preferably 500 mPa·s to 30,000 mPa·s in a measurement in accordance with JIS K7117-1, from the viewpoints of handleability, workability, and impregnation properties. When the initial viscosity is within the above-mentioned range, a product weight (mass) is stable when the reinforcement fibers (D) are coated and impregnated with the resin composition, and hence the product quality of the resulting prepreg is stable (product stability), which is useful.

[Reinforcement fibers (D)]

The prepreg according to the present invention includes the resin composition and the reinforcement fibers (D). Examples of the reinforcement fibers (D) include carbon fibers, glass fibers, silicon carbide fibers, alumina fibers, boron fibers, metal fibers, and organic fibers, such as aramid fibers, vinylon fibers, and Tetoron fibers. Among them, carbon fibers and glass fibers are preferred and carbon fibers are more preferred because a molded article with higher strength and higher elasticity can be obtained. These reinforcement fibers (D) can be used alone or in combination of two or more kinds.

As the carbon fibers, various kinds, such as polyacrylonitrile-based, pitch-based, and rayon-based carbon fibers, can be used. Of these, from the viewpoint of easily obtaining high-strength carbon fibers, polyacrylonitrile-based carbon fibers are preferred.

The form of the reinforcement fibers (D) is not particularly limited, and examples thereof include reinforcement fiber tows in which reinforcement fiber filaments are bundled together, unidirectional fiber materials in which reinforcement fiber tows are arranged in parallel in one direction, woven fabrics or nonwoven fabrics formed of reinforcement fibers that are cut into short lengths. When unidirectional fiber materials are used as the reinforcement fibers, stacking and molding the unidirectional fiber materials allows high mechanical properties to be obtained, which is preferred.

Examples of the woven fabrics include plain fabrics, twill fabrics, satin fabrics, and stitched sheets such as non-crimp fabrics in which sheets formed of fiber bundles arranged in parallel in one direction or sheets stacked at different stacking angles are stitched together in order to avoid separation.

The weight of the reinforcement fibers (D) (weight per square meter of the fibers) is not particularly limited, but is preferably 15 g/m$^2$ to 1000 g/m$^2$, and more preferably 20 g/m$^2$ to 500 g/m$^2$. When the weight is 15 g/m$^2$ or more, the variation in fiber width is small and mechanical properties become good, which is preferred. When the weight is 1000 g/m$^2$ or less, impregnation with the resin composition is enhanced, which is preferred.

From the viewpoint of achieving higher workability, an ethylenically unsaturated monomer can be used as a starting material for the prepreg according to the present invention. Examples of the ethylenically unsaturated monomer include styrene compounds, such as styrene, methylstyrene, halogenated styrene, and divinylbenzene; monofunctional (meth) acrylate compounds, such as methyl (meth)acrylate, ethyl (meth)acrylate, propyl (meth)acrylate, butyl (meth) acrylate, 2-ethylhexyl (meth) acrylate, cyclohexyl (meth)acrylate, isobornyl (meth)acrylate, benzyl (meth)acrylate, methylbenzyl (meth)acrylate, phenoxyethyl (meth) acrylate, methylphenoxyethyl (meth) acrylate, morpholine (meth) acrylate, phenylphenoxyethyl acrylate, phenylbenzyl (meth)acrylate, phenyl methacrylate, dicyclopentenyl (meth) acrylate, dicyclopentenyloxyethyl (meth)acrylate, and dicyclopentanyl methacrylate; hydroxyl group-containing (meth)acrylate compounds, such as hydroxyethyl (meth) acrylate, hydroxypropyl (meth) acrylate, and hydroxybutyl (meth)acrylate; di(meth)acrylate compounds, such as dimethacrylates of ethylene oxide adducts of bisphenol A, tricyclodecanedimethanol dimethacrylate, 1,12-dodecanediol dimethacrylate, hydrogenated bisphenol A di(meth)acrylate, polytetramethylene glycol dimethacrylate, 9,9-bis[4-(2-methacryloyloxyethoxy)phenyl]fluorene, dimethacrylates of ethylene oxide adducts of isosorbide, dimethacrylates of ethylene oxide adducts of hydrogenated bisphenol A, trimethacrylates of ethylene oxide adducts of trimethylolpropane, tetramethacrylates of ethylene oxide adducts of pentaerythritol, hexamethacrylates of ethylene oxide adducts of dipentaerythritol, ethylene glycol di(meth)acrylate, propylene glycol di(meth)acrylate, 1,4-butanediol di(meth)acrylate, 1,6-hexanediol di(meth)acrylate, bisphenol di(meth)acrylate, and 1,4-cyclohexanedimethanol di(meth)acrylate. These ethylenically unsaturated monomers can be used alone or in combination of two or more.

The prepreg according to the present invention may include components other than those described above. Examples of the components that can be incorporated into the prepreg include thermosetting resins, thermoplastic resins, polymerization inhibitors, curing accelerators, fillers, low profile additives, mold release agents, thickeners, viscosity depressants, pigments, antioxidants, plasticizers, flame retardants, antimicrobial agents, ultraviolet stabilizers, reinforcement materials, and photo-curing agents.

[Prepreg]

The prepreg according to the present invention is formed in an uncured or semi-cured state by causing a reaction of the resin composition and using the resultant. A molded article obtained using the prepreg according to the present invention is excellent in interlaminar shear strength, heat resistance, and other properties, which is preferred.

[Method for Producing Prepreg]

A method for producing the prepreg according to the present invention is characterized by including the steps of: (1) coating and impregnating the reinforcement fibers (D) with the resin composition (solution) controlled to have a temperature of 30° C. or lower; and (2) heating the reinforcement fibers (D) coated and impregnated with the resin composition, at a temperature of 40° C. to 80° C.

The coating and impregnation step (1) is performed using the resin composition controlled to have a temperature of 30° C. or lower (low temperature), whereby rapid thickening does not occur, a pot life for the coating can be prevented from being made shorter, and hence, the reinforcement fibers (D) can be impregnated uniformly with the resin composition.

At the heating step (2), the adjustment of the atmosphere to 40° C. to 80° C. and the use of the amine catalyst (C) inhibit the decomposition of the polymerization initiator (B) (for example, an organic peroxide) and accelerate a urethanization reaction caused by a reaction of the component (a1) with the component (a2), which is useful. The adjustment of the temperature to 40° C. to 80° C. causes the effect of rapid thickening, and, as the viscosity of the resin composition increases, the movement of the reinforcement fibers (D) and the movement of the resin composition itself are reduced, whereby a prepreg having a stable product-weight can be obtained to result in excellent product stability, which is useful.

Note that the pot life for the coating at the step (1) is not particularly limited, but is preferably 12 minutes or longer.

The reaction time at the heating step (2) is also not particularly limited, but is preferably 1 minute to 30 minutes.

The method for producing the prepreg according to the present invention preferably further includes a step (3) of aging for 12 hours to 48 hours in an atmosphere of 10° C. to 50° C. The adjustment to the atmosphere of 10° C. to 50° C. (low temperature) at the aging step causes a viscosity with which the movement of the reinforcement fibers (D) and the resin composition itself can be reduced, which is useful. The aging for 12 hours to 48 hours leads to excellent workability and handleability in the stacking of the prepreg, which is useful.

The content (amount) of the reinforcement fibers (D) in the prepreg according to the present invention is preferably within a range of 35% by mass to 85% by mass and more preferably within a range of 45% by mass to 75% by mass, from the viewpoint of achieving higher mechanical strength of the resulting molded article.

The thickness of the prepreg according to the present invention is preferably 15 μm to 1000 μm, and more preferably 20 μm to 500 μm. When the prepreg is prepared to have the above-mentioned thickness, handling becomes easier in the stacking of the prepreg, which is preferred.

[Molded Article]

The present invention relates to a molded article being a cured product of the prepreg. Since the molded article is obtained using the prepreg, the occurrence of poor molding is reduced, and excellent workability and handleability are achieved, which is preferred.

[Methods for Producing Molded Article]

The prepreg may be subjected to final curing to form a cured product (a molded article). In the case of forming a laminate by using the prepreg, after the preparation of the prepreg, the prepreg and other layers are stacked and then subjected to the final curing, whereby the laminate in which the layers adhere closely to each other can be formed. Note that the prepreg can be a thermosetting prepreg, an electron beam curable prepreg, or the like, but, from the viewpoint of workability and cost, a thermosetting prepreg is preferably used.

Specific examples of a method that can be used for obtaining a molded article by using the prepreg include a method in which, after 8 to 16 sheets of the prepreg are stacked, the resulting stack of the sheets is put into a mold having been preheated to 110° C. to 160° C., and clamping is performed with a compression molding machine to shape the prepreg, and a molding pressure of 0.1 MPa to 10 MPa is maintained to cure the prepreg, and then the resulting molded article is removed from the mold and obtained. In this case, a production method can be used in which heat compression molding is performed with a mold having a shear edge at a mold temperature of 120° C. to 160° C. and a molding pressure of 1 Mpa to 8 Mpa for 1 to 2 minutes per millimeter of the thickness of the molded article.

EXAMPLES

Hereinafter, the present invention will be described in more detail by using specific examples.

<Initial Viscosity (at 20° C.) of Resin Composition>

The resin composition immediately after the mixing was sampled. Subsequently, the viscosity at 20° C. of the resin composition was measured with a Brookfield viscometer in accordance with JIS K7117-1. Note that the initial viscosity (at 20° C.) of the resin composition is preferably 300 mPa·s to 50,000 mPa·s and more preferably 500 mPa·s to 30,000 mPa·s from the viewpoints of handleability, workability, and impregnation properties.

<Measurement of Pot Life>

The resin composition immediately after the mixing before the impregnation into the carbon fibers was sampled. Subsequently, the viscosity of the resin composition was measured at 25° C. with a rheometer (a dynamic viscoelasticity measurement device), and a time (a pot life) elapsed until the viscosity doubled was measured to make an evaluation. Note that, as the pot life, a time elapsed from the time immediately after the mixing of the resin composition to the time the viscosity doubled at 25° C. is preferably 12 minutes or longer. When the time is 12 minutes or longer, the resin composition can have a sufficient pot life and thereby have excellent workability and handleability, which is useful.

<Mass (Weight) Measurement Per Unit Area of Prepreg>

The prepreg was cut into pieces with a length of 50 cm at sampling intervals of every 10% of a processing length, and then each of the cut pieces of the prepreg was cut at positions 10 mm away from left and right carbon fiber ends thereof, and the mass of the resultant was measured using a precision balance to make an evaluation. Note that, as for the weight, the sampling was performed every 10% of the processing length, and the average (n=3) of the mass is preferably within ±3%, more preferably within ±2.5%, and still more preferably within ±2%. When preparation is performed to achieve ±3%, mass variation is reduced and excellent product stability is achieved, which is useful.

Preparation Example 1

50 parts by mass of a mixture of polymethylene polyphenyl polyisocyanate and 4,4'-diphenylmethane diisocyanate ("Millionate MR-200", manufactured by Tosoh Corporation), 50 parts by mass of 4,4'-diphenylmethane diisocyanate, 66 parts by mass of 2-hydroxyethyl methacrylate (HEMA), 25 parts by mass of NEWPOL BPE-20 (manufactured by Sanyo Chemical Industries, Ltd.: EO adduct of bisphenol A, hydroxyl equivalent: 164 g/eq), 31 parts by mass of NEWPOL BPE-40 (manufactured by Sanyo Chemical Industries, Ltd.: EO adduct of bisphenol A, hydroxyl equivalent: 204 g/eq), 3 parts by mass of a polymerization initiator ("Kayaester TMPO-70" by Kayaku Nouryon Corporation, organic peroxide, 1,1,3,3-tetramethylbutyl peroxy-2-ethylhexanoate, 10-hour half-life temperature of 65° C.), and 0.03 parts by mass of an amine catalyst ("TOYOCAT DB-30" by Tosoh Corporation) were mixed to obtain a resin composition (1) for prepreg. The initial viscosity (at 20° C.) of the resin composition (1) was 3000 mPa·s, and the pot life was approximately 14 minutes.

Preparation Example 2

50 parts by mass of a mixture of polymethylene polyphenyl polyisocyanate and 4,4'-diphenylmethane diisocyanate ("Millionate MR-200", manufactured by Tosoh Corporation), 50 parts by mass of 4,4'-diphenylmethane diisocyanate, 66 parts by mass of 2-hydroxyethyl methacrylate (HEMA), 25 parts by mass of NEWPOL BPE-20 (manufactured by Sanyo Chemical Industries, Ltd.: EO adduct of bisphenol A, hydroxyl equivalent: 164 g/eq), 31 parts by mass of NEWPOL BPE-40 (manufactured by Sanyo Chemical Industries, Ltd.: EO adduct of bisphenol A, hydroxyl equivalent: 204 g/eq), 3 parts by mass of a polymerization initiator ("Kayaester TMPO-70" by Kayaku Nouryon Corporation, organic peroxide, 1,1,3,3-tetramethylbutyl peroxy-2-ethylhexanoate, 10-hour half-life temperature of 65° C.), and 0.03 parts by mass of an amine catalyst ("U-CAT SA1" by San-Apro Ltd.) were mixed to obtain a resin composition (2) for prepreg. The initial viscosity (at 20° C.) of the resin composition (2) was 2500 mPa·s, and the pot life was approximately 15 minutes.

Example 1

The resin composition (1) for prepreg was applied to one surface of a polyethylene terephthalate film which had been subjected to mold release treatment, and then impregnated at 25° C. into carbon fibers ("T-700-12K-50C", manufactured by Toray Industries, Inc.) such that the carbon fiber content was 50% by mass, and, after the same type of a film was placed on the resultant, taking-up was performed via a heating line at 70° C. for 3 minutes to obtain a prepreg (1) having a length of 300 m. The mass per unit area was within ±2.5% in the processing length of 300 m.

Example 2

The resin composition (2) for prepreg was applied to one surface of a polyethylene terephthalate film which had been subjected to mold release treatment, and then impregnated at 25° C. into carbon fibers ("T-700-12K-50C", manufactured by Toray Industries, Inc.) such that the carbon fiber content was 50% by mass, and, after the same type of a film was placed on the resultant, taking-up was performed via a heating line at 70° C. for 3 minutes to obtain a prepreg (2) having a length of 300 m. The mass per unit area was within ±2.5% in the processing length of 300 m.

Preparation Example 3

50 parts by mass of a mixture of polymethylene polyphenyl polyisocyanate and 4,4'-diphenylmethane diisocyanate ("Millionate MR-200", manufactured by Tosoh Corporation), 50 parts by mass of 4,4'-diphenylmethane diisocyanate, 66 parts by mass of 2-hydroxyethyl methacrylate (HEMA), 25 parts by mass of NEWPOL BPE-20 (manufactured by Sanyo Chemical Industries, Ltd.: EO adduct of bisphenol A, hydroxyl equivalent: 164 g/eq), 31 parts by mass of NEWPOL BPE-40 (manufactured by Sanyo Chemical Industries, Ltd.: EO adduct of bisphenol A, hydroxyl equivalent: 204 g/eq), and 3 parts by mass of a polymerization initiator ("Kayaester TMPO-70" by Kayaku Nouryon Corporation, organic peroxide, 1,1,3,3-tetramethylbutyl peroxy-2-ethylhexanoate, 10-hour half-life temperature of 65° C.) were mixed to obtain a resin composition (3) for prepreg. The initial viscosity (at 20° C.) of the resin composition (3) was 2500 mPa·s, and the pot life was approximately 20 minutes.

Preparation Example 4

50 parts by mass of a mixture of polymethylene polyphenyl polyisocyanate and 4,4'-diphenylmethane diisocyanate ("Millionate MR-200", manufactured by Tosoh Corporation), 50 parts by mass of 4,4'-diphenylmethane diisocyanate, 66 parts by mass of 2-hydroxyethyl methacrylate (HEMA), 25 parts by mass of NEWPOL BPE-20 (manufactured by Sanyo Chemical Industries, Ltd.: EO adduct of bisphenol A, hydroxyl equivalent; 164 g/eq), 31 parts by mass of NEWPOL BPE-40 (manufactured by Sanyo Chemical Industries, Ltd.: EO adduct of bisphenol A, hydroxyl equivalent: 204 g/eq), 3 parts by mass of a polymerization initiator ("Trigonox 122-80C" by Kayaku Nouryon Corporation, organic peroxide, 1,1-di(tert-amylperoxy)cyclohexane, 10-hour half-life temperature of 93° C.), and 0.02 parts by mass of a tin catalyst ("NEOSTANN U-830" by Nitto Kasei Co., Ltd.) were mixed to obtain a resin composition (4) for prepreg. The initial viscosity (at 20° C.) of the resin composition (4) was 3000 mPa·s, and the pot life was approximately 5 minutes.

Comparative Example 1

The resin composition (3) for prepreg was applied to one surface of a polyethylene terephthalate film which had been subjected to mold release treatment, and then impregnated at 25° C. into carbon fibers ("T-700-12K-50C", manufactured by Toray Industries, Inc.) such that the carbon fiber content was 50% by mass, and, after the same type of a film was placed on the resultant, taking-up was performed via a heating line at 70° C. for 3 minutes to obtain a prepreg (3) having a length of 300 m. Although the mass per unit area was within ±4% in the processing length of 300 m, the result was out of within ±3%.

Comparative Example 2

The resin composition (4) for prepreg was applied to one surface of a polyethylene terephthalate film which had been subjected to mold release treatment, and then impregnated at 25° C. into carbon fibers ("T-700-12K-50C", manufactured by Toray Industries, Inc.) such that the carbon fiber content was 50% by mass, and, after the same type of a film was placed on the resultant, taking-up was performed via a heating line at 70° C. for 3 minutes. At the time when a prepreg (4) having a length of 10 m was obtained, the application was not able to be continued due to thickening, hence the line was stopped.

From the above-mentioned evaluation results, it was confirmed that, in Examples 1 and 2, the preparation of the prepregs by using the respective desired resin compositions reduced an increase in the viscosity of the resin compositions, and caused the product weight of the prepregs themselves to be stable, and yielded excellent handleability and product stability.

In contrast, in Comparative Example 1, it was confirmed that, since the prepreg was prepared without an amine catalyst, compared to Examples, the pot life was longer owing to the use of no catalyst, but variation in product weight was larger and product stability was poorer. In Comparative Example 2, it was confirmed that, since the tin catalyst as a metal catalyst was used instead of an amine catalyst, after the passage through the heating line, the viscosity increased rapidly to cause thickening, whereby impregnation (application) work into the carbon fibers became difficult, which resulted in poor handleability and product stability.

INDUSTRIAL APPLICABILITY

According to the present invention, a prepreg capable of reducing thickening after the preparation of the resin composition (solution) and having a stable product-weight after the heating step can be obtained, and thus the prepreg has excellent workability and product stability, reduces the occurrence of poor molding, and allows the achievement of a molded article having excellent workability and handleability, whereby the prepreg and the molded article can be used in, for example, automobile components, railway vehicle components, aerospace craft components, ship components, housing equipment components, sporting components, light vehicle components, building and civil engineering components, and casings of OA equipment, and are particularly suitably used in housing equipment components and building and civil engineering components.

The invention claimed is:

1. A prepreg, comprising:
    a resin composition including
        a urethane (meth)acrylate (A),
        a polymerization initiator (B), and
        an amine catalyst (C), wherein the amine catalyst is an acid-blocked amine catalyst; and
    reinforcement fibers (D), wherein the urethane (meth)acrylate (A) is a reaction product of a polyisocyanate compound (a1) and a hydroxyl group-containing compound (a2), the polyisocyanate compound (a1) including polymethylene polyphenyl polyisocyanate and diphenylmethane diisocyanate, the hydroxyl group-containing compound (a2) including a compound having a hydroxyl group and a (meth)acryloyl group.

2. The prepreg according to claim 1, wherein a dissociation temperature of the acid-blocked amine catalyst is 50° C. to 70° C.

3. The prepreg according to claim 1, wherein the diphenylmethane diisocyanate is at least one selected from the group consisting of 2,4'-diphenylmethane diisocyanate, 4,4'-diphenylmethane diisocyanate, and carbodiimide-modified 4,4'-diphenylmethane diisocyanate.

4. The prepreg according to claim 1, wherein an initial viscosity (at 20° C.) of the resin composition is 300 mPa·s to 50,000 mPa·s.

5. A method for producing the prepreg, the prepreg according to claim 1, the method comprising:

a step of coating and impregnating the reinforcement fibers (D) with the resin composition controlled to have a temperature of 30° ° C. or lower; and a step of heating, at a temperature of 40° ° C. to 80° C., the reinforcement fibers (D) coated and impregnated with the resin composition.

6. The method for producing the prepreg according to claim 5, the method further comprising a step of aging for 12 hours to 48 hours in an atmosphere of 10° ° C. to 50° C.

7. A molded article, being a cured product of the prepreg according to claim 1.

* * * * *